US008227747B2

(12) United States Patent
Roukes et al.

(10) Patent No.: US 8,227,747 B2
(45) Date of Patent: Jul. 24, 2012

(54) SINGLE MOLECULE MASS SPECTROSCOPY ENABLED BY NANOELECTROMECHANICAL SYSTEMS (NEMS-MS)

(75) Inventors: Michael L. Roukes, Pasadena, CA (US); Akshay Naik, Pasadena, CA (US); Mehmet Selim Hanay, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 461 days.

(21) Appl. No.: 12/358,807

(22) Filed: Jan. 23, 2009

(65) Prior Publication Data

US 2009/0261241 A1    Oct. 22, 2009

Related U.S. Application Data

(60) Provisional application No. 61/062,339, filed on Jan. 25, 2008.

(51) Int. Cl.
*B01D 59/44* (2006.01)
*H01J 49/00* (2006.01)

(52) U.S. Cl. ........ 250/282; 250/281; 250/283; 250/287; 250/288; 250/289; 250/290; 250/291; 250/292

(58) Field of Classification Search .......... 250/281–283, 250/287–292
See application file for complete search history.

(56) References Cited

U.S. PATENT DOCUMENTS

| | | | |
|---|---|---|---|
| 6,814,870 B2 * | 11/2004 | Zhang et al. | 210/656 |
| 7,407,814 B2 | 8/2008 | Roukes et al. | |
| 2003/0033876 A1 * | 2/2003 | Roukes et al. | 73/580 |

OTHER PUBLICATIONS

Aebersold et al., "Mass spectrometry-based proteomics," Nature, Mar. 13, 2003, 422:198-207.
Bargatin et al., "Efficient electrothermal actuation of multiple modes of high-frequency nanoelectromechanical resonators," Applied Physics Letters, 2007, 90:093116-1 to 093116-3.
Cabodi et al., "Entropic Recoil Separation of Long DNA Molecules," Anal. Chem., 2002, 74:5169-5174.
Cho et al., "Creating, Transporting, Cutting, and Merging Liquid Droplets by Electrowetting-Based Actuation for Digital Microfluidic Circuits," J. Microelectromechanical Systems, Feb. 2003, 12(1):70-80.
Cho et al., "Particle Separation and Concentration Control for Digital Microfluidic Systems," Proc. IEEE Microelectromechanical System, 2003:686-689.
Cleland et al., "Fabrication of high frequency nanometer scale mechanical resonators from bulk Si crystals," Appl. Phys. Lett., Oct. 28, 1996, 69(18):2653-2655.
Cleland et al., "Noise processes in nanomechanical resonators," J. Appl. Phys., Sep. 1, 2002, 92(5):2758-2769.
Cook, Kelsey D., "Electrohydrodynamic mass spectrometry," Mass Spectrometry Reviews, 1986, 5:467-519.
Ekinci et al., "Ultimate limits to inertial mass sensing based upon nanoelectromechanical systems," J. Appl. Phys., Mar. 1, 2004, 95(5):2682-2689.

(Continued)

*Primary Examiner* — Jack Berman
*Assistant Examiner* — Meenakshi Sahu
(74) *Attorney, Agent, or Firm* — Foley & Lardner LLP

(57) ABSTRACT

The present invention relates to an apparatus for measuring a mass of a sample, using a nanoelectromechanical system (NEMS) arranged to receive the sample added onto a resonator of the NEMS and a microfluidic sample delivery and sample ionization system. The nanoelectromechanical system is located at an output of the ionization system. The nanoelectromechanical resonator system is highly sensitive and is capable of detecting masses in the single Dalton range.

24 Claims, 13 Drawing Sheets

A    B    C    D

OTHER PUBLICATIONS

Ekinci et al., "Ultrasensitive nanoelectromechanical mass detection," Appl. Phys. Lett., May 31, 2004, 84(22):4469-4471.

Ghatkesar et al., "Higher modes of vibration increase mass sensitivity in nanomechanical nnicrocantilevers," Nanotechnology, 2007, 18:445502, 1-8.

Godovac-Zimmermann et al., "Perspectives for mass spectrometry and functional protemics," Mass Spectrometry Reviews, 2001, 20:1-57.

Houseman et al., "Peptide chips for the quantitative evaluation of protein kinase activity," Nature Biotechnology, Mar. 2002, 20:270-274.

Houseman et al., "Towards quantitative assays with peptide chips: a surface engineering approach," Trends in Biotechnology, Jul. 2002, 20(7):279-281.

Li et al., "Application of Microfluidic Devices to Proteomics Research," Molecular & Cellular Proteomics, 2002, 1.2:157-168.

Musyimi et al., "Online CE-MALDI-TOF-MS Using a Rotating Ball Interface," Anal. Chem., 2004, 76:5968-5973.

Paik et al., "Electrowetting-based droplet mixers for microfluidic systems," Paik, Lab on a Chip, 2003, 3:28-33.

Pollack et al., "Electrowetting-based actuation of liquid droplets for microfluidic applications," Applied Physics Letters, Sep. 11, 2000, 77(11):1725-1726.

Sung et al., "Chip-based microfluidic devices coupled with electrospray ionization-mass spectrometry," Electrophoresis, 2005, 26:1783-1791.

Tan et al., "Chip-Based Solid-Phase Extraction Pretreatment for Direct Electrospray Mass Spectrometry Analysis Using an Array of Monolithic Columns in a Polymeric Substrate," Anal. Chem., 2003, 75:5504-5511.

Verbridge et al., "High quality factor resonance at room temperature with nanostrinsg under high tensile stress," J. Appl. Physics, 2006, 99:124304-1 to 124304-8.

Wang et al., "Integration of immobilized trypsin bead beds for protein digestion within a microfluidic chip incorporating capillary electrophoresis separations and an electrospray mass spectrometry interface," Rapid Communications in Mass Spectrometry, 2000, 14:1377-1383.

Xie et al., "Microfluidic Platform for Liquid Chromatography-Tandem Mass Spectrometry Analyses of Complex Peptide Mixtures," Anal. Chem., 2005, 77:6974-6953.

Yang et al., "Zeptogram-Scale Nanomechanical Mass Sensing," Nano Letters, Apr. 2006, 6(4):583-586.

* cited by examiner

A  B  C  D

A  B  C

US 8,227,747 B2

SINGLE MOLECULE MASS SPECTROSCOPY ENABLED BY NANOELECTROMECHANICAL SYSTEMS (NEMS-MS)

CROSS-REFERENCE TO RELATED PATENT APPLICATIONS

This application claims priority from U.S. Provisional Application Ser. No. 61/062,339, filed Jan. 25, 2008, incorporated herein by reference in its entirety.

GOVERNMENT RIGHTS

This invention was made with Government Support under Grant No. GM072898 awarded by the National Institutes of Health. The U.S. Government has certain rights in this invention.

BACKGROUND OF THE INVENTION

The present invention relates generally to the field of mass spectrometry and its application to proteomics and system biology. Specifically, the invention relates to a combination of microfluidics systems with NEMS to form a compact mass spectrometer which can be used for sample analysis, such as for the analysis of biological samples, or the analysis of environmental pollutants.

Mass spectroscopy (MS) is one of the most important tools in the molecular biologist's arsenal for quantitative genomics and proteomics. Although MS-based proteomics is still an emerging technology where revolutionary change is possible, several concepts previously proposed are now under development or have been developed and have the potential to alter the landscape of current MS-based proteomic technologies. One of these is the analysis of intact proteins. The currency of essentially all MS-based identifications is peptides. The convergence of mass spectrometers with large mass ranges, extremely high mass accuracy and resolution, and ionization/fragmentation methods compatible with large proteins has catalyzed the emergence of whole-protein proteomics.

Recent successes illustrate the role of mass spectrometry-based proteomics as an indispensable tool for molecular and cellular biology and for the emerging field of systems biology. The ability of mass spectrometry to identify and, increasingly, to precisely quantify thousands of proteins from complex samples can be expected to impact broadly on biology and medicine. See R. Aebersold, M. Mann, Nature 422, 198 (2003). Presently there is no other technology that can rival the speed, sensitivity, and exact molecular characterization of proteins that MS based methods allow. See L. R. B. Jasminka Godovac-Zimmermann, Mass Spectrometry Reviews 20, 1 (2001). Realistically, however, the sensitivity should be down to the level of about 10 copies per cell on the assumption that if there are 10 copies in a cell, they're actually doing something of note. Progress in systems biology requires the development of protocols that enable studies with resolution at the level of the individual cell with very high throughput. Achieving this, of course, will require protocols having the capability of analyzing few-to-a single molecule in a cell so that the rarest of biomolecular species are identified, e.g., transcription factors and signaling molecules, which exert control over critical "nodes" within the bio-information cascade.

With single-cell resolution it will ultimately become possible to routinely stratify the fine details of biological sub-processes within populations, resolving individual pathways and reactions that are hidden from standard cell-culture-scale ensemble averages.

SUMMARY OF THE INVENTION

One embodiment of the invention relates to an apparatus for measuring a mass of a sample. The apparatus comprises a nanoelectromechanical system (NEMS) arranged to receive the biological sample added onto a resonator of the NEMS and a microfluidic sample delivery and sample ionization system. The nanoelectromechanical system is located at an output of the ionization system.

In another embodiment, the present invention relates to a measurement method that comprises ionizing a sample and receiving the ionized sample onto a resonator of NEMS. By detecting a change in vibration frequency of the resonator the mass adsorbed is measured.

curve is the thermomechanical limit with the present setup. By using an amplifier with a noise floor of 3 K, we expect the mass sensitivity to reach the level of 10 Da (black curve). To attain the single Dalton sensitivity, the resonant frequency of the NEMS can be increased to 1 GHz and also use higher order modes. The lowest curve is obtained by assuming a NEMS of 1 GHZ and noise temperature of 3 K.

Figure 12:
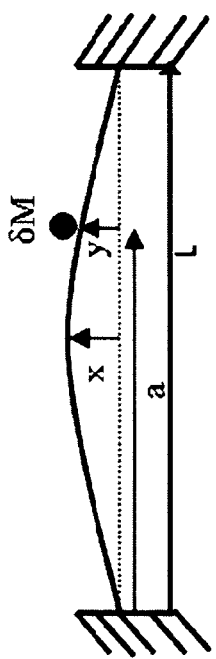

FIG. 12 is a schematic of a doubly-clamped beam deflection.

Figure 13A:
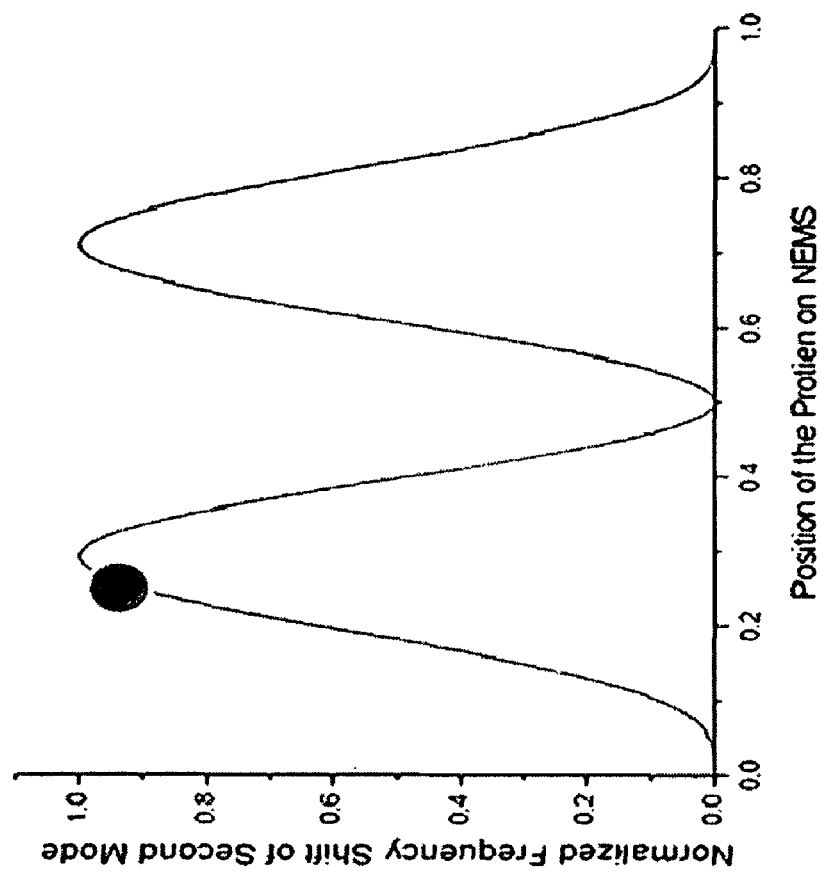
Figure 13B:
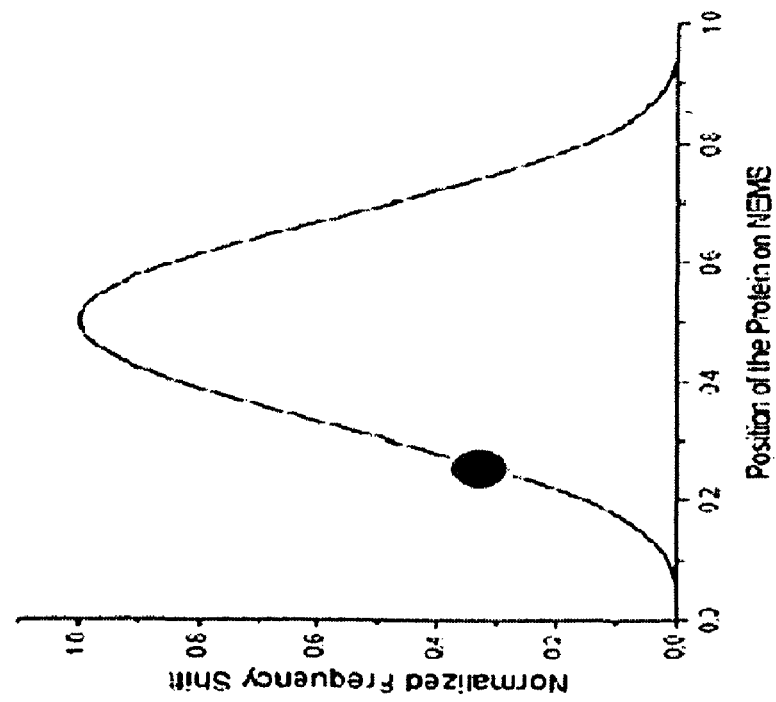

FIG. 13 is a schematic illustration of detection point masses using multimode detection scheme. The graph shows the amount of frequency change as a function of landing position. FIG. 13A shows the first mode's spatial response, and FIG. 13B shows the second mode's spatial response. The graphs are normalized so that the maximum frequency shift is unity.

Figure 14:
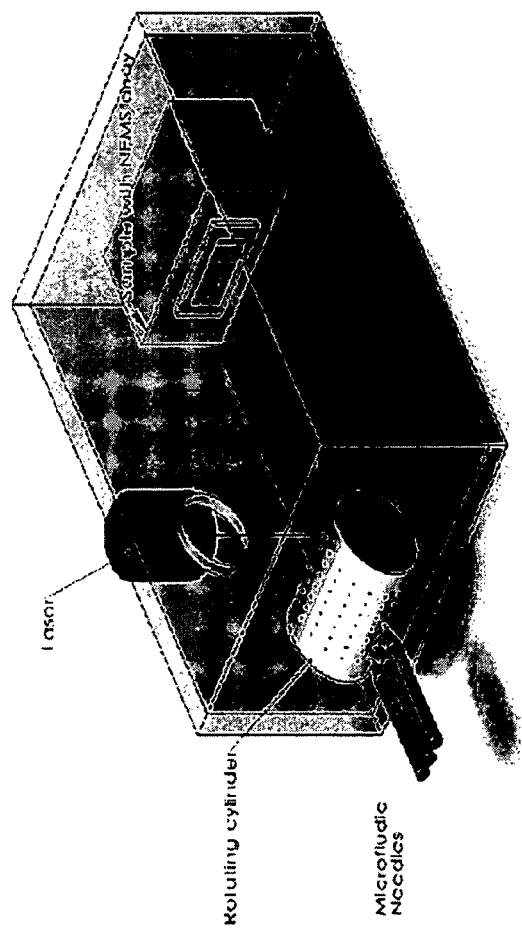

FIG. 14 is a schematic view of the rotating cylinder microfluidic system combined with NEMS array for mass detection of proteins.

Figure 15:
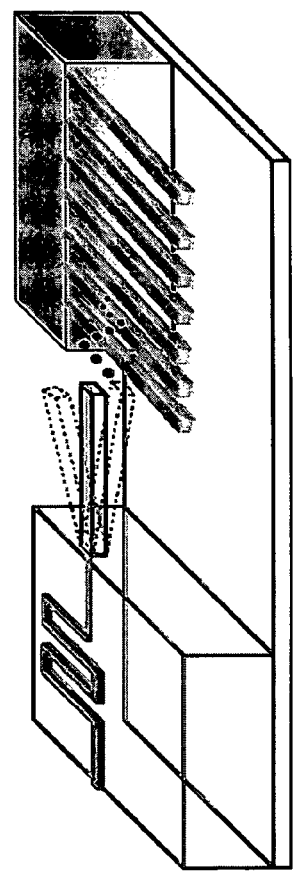

FIG. 15 shows a representation of the NEMS MS detector arrays combined with inertial NEMS spraying system.

Figure 16:
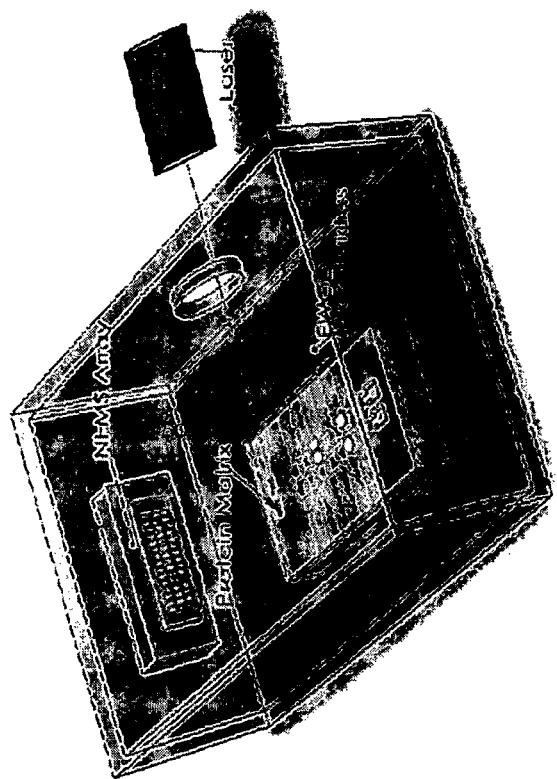

FIG. 16 illustrates a microfluidics system based on the EWOD can be used to make protein array which can then be used with NEMS array for mass spectrometry.

Figure 17:
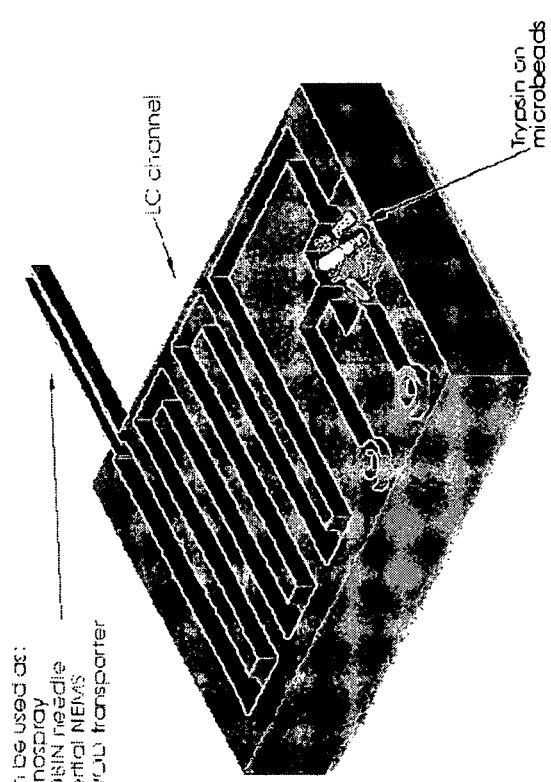

FIG. 17 shows a schematic of the microfluidic chip while coupled to a protein delivery mechanism.

Figure 18:
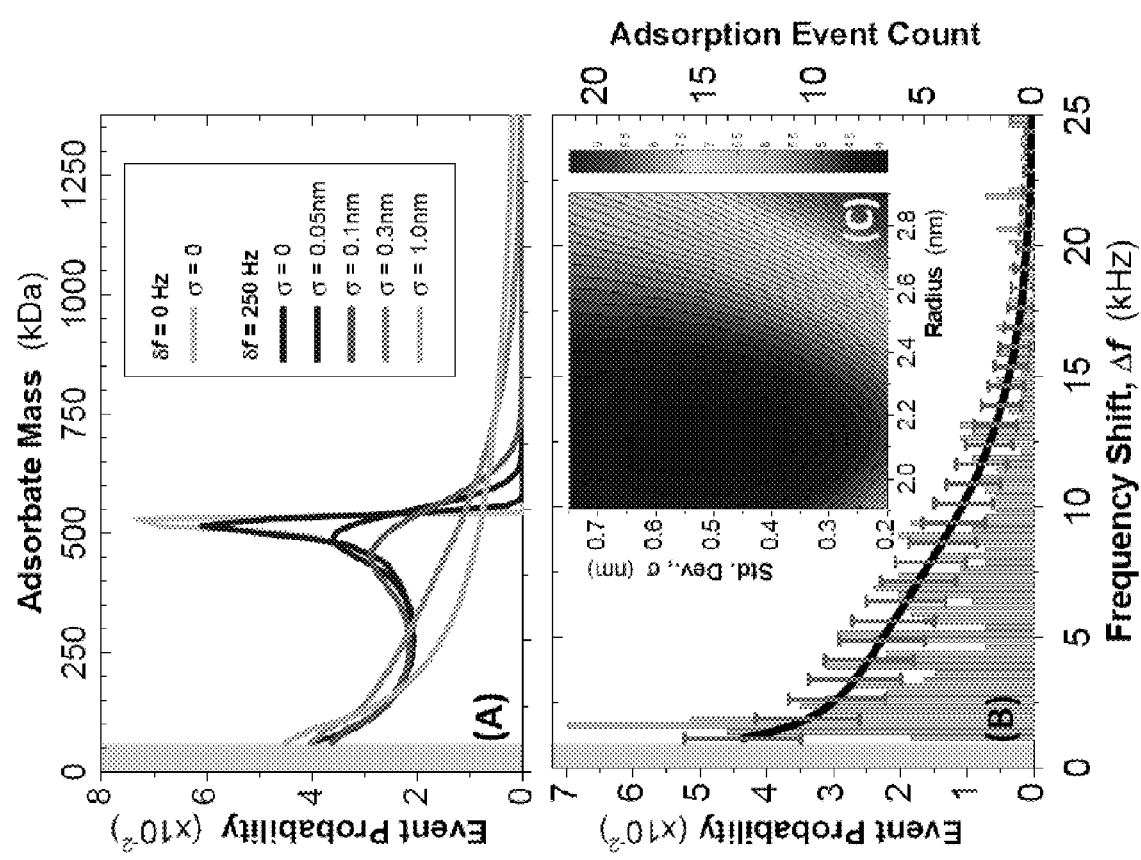

FIG. 18 (A) Illustrates the theoretically expected event probabilities versus frequency-jump amplitudes are shown for "nominal" 2.5 nm radius Au nanoparticles, delivered with an average flux uniformly that is distributed over a doubly-clamped beam having peak mass responsivity 12 Hz/zg. Traces show expected results for a monodisperse ensemble of particles, as well as for several dispersions (characterized by their radius standard deviations), for the cases of perfect (0 Hz) and experimentally-relevant (250 Hz) frequency resolutions. FIG. 18B shows the experimentally obtained histogram of adsorption event probabilities versus frequency-jump amplitude for electrosprayed gold nanoparticles, and the expected curve for a average radius of 2.15 nm and a radial dispersion of 0.375 nm (black trace). Error bars (light color) display the theoretically-expected deviations corresponding to 544 adsorption events, as registered in this experiment. FIG. 18C is a contour plot showing the residues for least-square fits to the experimental data using radius and radial dispersion as the fitting parameter. These data establish the average radius and size dispersion for the 544 nanoparticles measured.

Figure 19:
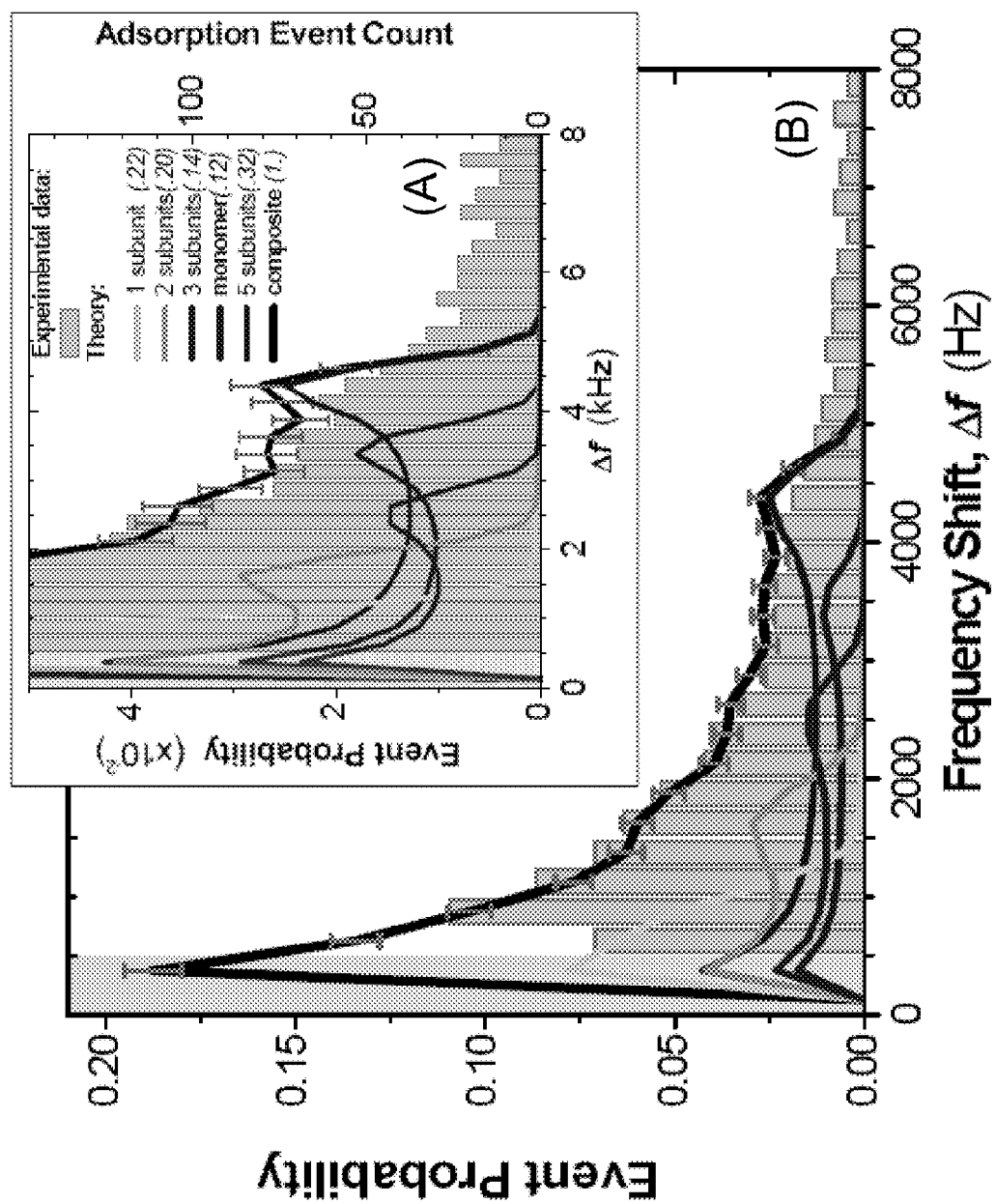

FIG. 19 shows a plot of NEMS-MS of P-Amylase by adsorption-event probability analysis. Discrete experimental adsorption events, obtained using a hexapole drive frequency of 450 kHz, are assigned to 250 Hz wide bins in this histogram (bars). FIG. 19A shows an expanded view of the low event probability region. The experimental histogram can be readily explained by assuming a weighted superposition of subunits. A clearly-detailed theoretical decomposition (light curves) of the composite curve (black trace) is shown. A broad shoulder is evident in the event probability histogram at 3600 Hz; this shoulder is due to β-amylase monomer. The low, but finite probability in the experimental data for $\Delta f > 5$ kHz appears to indicate the presence of compound species with masses greater than that of five protein subunits, which have not been modeled in our composite curve. FIG. 19B gives an overall view of the entire data set and composite curves. The weighting functions for the composite curve, here determined using residual method discussed in the text, are displayed

DETAILED DESCRIPTION OF THE PREFERRED EMBODIMENTS

The references cited herein, including patents and patent applications, are incorporated by reference, in their entirety.

Technical and scientific terms used herein have the meanings commonly understood by one of ordinary skill in the art to which the present invention pertains, unless otherwise defined. Reference is made herein to various methodologies known to those of ordinary skill in the art. Publications and other materials setting forth such known methodologies to which reference is made are incorporated herein by reference in their entireties as though set forth in full. Materials, reagents and the like to which reference is made in the following description and examples are obtainable from commercial sources, unless otherwise noted.

As used herein, the singular forms "a," "an," and "the" designate both the singular and the plural, unless expressly stated to designate the singular only.

As used herein, "about" will be understood by persons of ordinary skill in the art and will vary to some extent on the context in which it is used. If there are uses of the term which are not clear to persons of ordinary skill in the art given the context in which it is used, "about" will mean up to plus or minus 10% of the particular term.

Embodiments of the present invention relate to a compact mass spectrometer capable of measuring the mass of biomolecules and other analytes. The inventive methodology is based on the observation that the resonant frequency of nanoelectromechanical system (NEMS) changes when a small amount of mass is accreted on it. This change in resonant frequency can be used to determine the total mass of the accretion. It has been shown at least theoretically that NEMS are capable of detecting mass changes in the single Dalton range. This high sensitivity combined with fast detection rates makes these systems extremely useful in mass detection of proteins and peptides.

Nanoelectromechanical system (NEMS) based mass spectrometry (NEMS-MS) therefore provides a new paradigm for high-throughput biological mass spectrometry with single-molecule resolution.

The feasibility of NEMS-MS as a practical tool for biochemical applications, relies on the ability to harness technologies from various other fields of science and engineering. Non-limiting exemplars of such technological ingredients are:

Nanoelectromechanical Systems for Mass Sensing:

The vibrational frequency of a NEMS resonator is an exquisitely sensitive function of its total mass. Any small variation in mass, e.g. from adsorbed addenda, will measurably alter its resonant frequency. Hence, nanomechanical resonators can be used as sensitive mass analyzers. Based on theoretical calculations for physically realizable devices, we have shown that a mass sensitivity below a single Dalton is realizable. These calculations correctly predict the performance of existing state of-the-art NEMS resonators. Furthermore, this technique for mass sensing has some significant advantages such as straightforward integration with microfluidic preprocessors, extremely large mass dynamic range, and simpler forms of spectrometry since it is mass itself, and not m/z, that is detected. (Multiply-charged species "weigh" the same.) The attainment of zeptogram (zg) mass sensitivity is described in two papers that first showed 7 zg, then 1 zg mass sensitivity. See X. L. Feng, Ph.D. Thesis, Caltech, "Ultra-High Frequency Nanoelectromechanical Systems with Low Noise Technologies for Single-Molecule Mass Sensing" (2007), and Y. Y. T. Yang, C. C. Callegari, X. X. L. Feng, K. K. L. Ekinci, M. M. L. Roukes, Nano Letters 6, 583 (2006).

VLSI Microfluidics

Soft multi-level microfluidics have permitted the integration of thousands of valves and chemical processing chambers onto individual chips. This technology has already enabled the automation of a vast spectrum of high-throughput biochemical protocols. The advantages of such processors lie in their ability to handle and process small amounts of analyte, and to do so in a massively parallel manner allowing high-throughput analysis. Very large scale integration of nanosensor arrays embedded into such microfluidic systems are shown in FIGS. 1A-1D. The first generation arrays consisted of 200 mm (8") nanoelectromechanical system wafers produced at CEA/LETI-Mintech, Grenoble, through the Alliance of Nanosystem VLSI collaboration. The first generation wafers comprise 2,000,000 NEMS devices (progressive magnification shown in FIG. 1).

In one embodiment, the material of the NEMS is doubly clamped SiC beam with aluminum deposited on top for electrical contact. The resonator sits on the silicon substrate. The NEMS is 1.8 μm long, 120 nm wide and 100 nm thick and has a resonant frequency of ~450 MHz and a quality factor of about 2000. The chip has another NEMS of similar dimensions which acts as a dummy resonator for making bridge measurements. In yet another embodiment, the NEMS is less than 1000 nm in at least one dimension, preferably in at least two dimensions. In certain embodiments the NEMS is a vibrating plate, or a vibrating cantilever.

The structural material for the ultrahigh frequency (UHF) NEMS devices are 100 nm thick single crystal 3-C silicon carbide (SiC) epilayer deposited on a silicon substrate through molecular beam epitaxy. Materials like SiN are also used as structural materials for the NEMS device. Thin-film metal conductors are defined by optical lithography to form wirebond pads and a lead-frame that converges into the central, active region of each device where the NEMS are located. Each of these small chips is manually diced for subsequent individual processing. Electron-beam lithography is used to laterally define on the SiC epilayer what ultimately become nanometerscale NEMS features. Thermal evaporation is used to deposit 40 nm of Al followed by 5 nm Ti on these patterns, and standard lift-off is then employed to define the metallization layer. This metallization layer connects to the larger aforementioned lead-frame, and also serves as a mask for the subsequent etching process. The metal-masked SiC epilayer is etched in an $Ar/NF_3$ plasma created by an electron cyclotron resonance (ECR) plasma-etching system. This dry etch step removes the SiC in unprotected regions and undercuts the silicon beneath the masked SiC, to result in a fully suspended NEMS beam.

Figure 1:
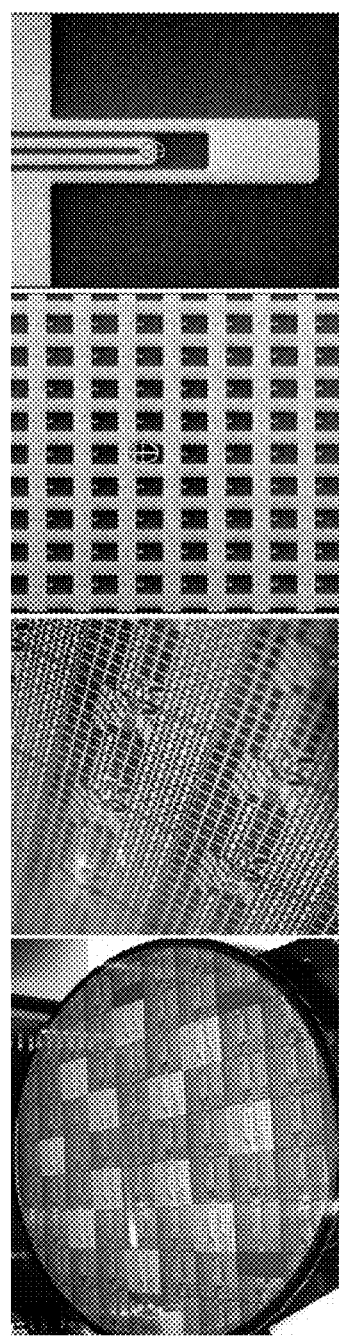
FIGS. 1A-1D are photographs and micrographs of very large scale intergration of NEMS systems
Figure 2:
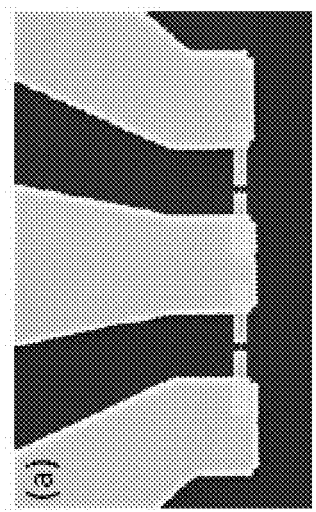
FIGS. 2A and 2B illustrates scanning electron micrographs showing one of the NEMS device used in the experiments.
FIG. 2C shows the magnitude and phase of the UHF NEMS resonator's response displaying a fundamental mode resonance near 429 MHz.
Figure 2:
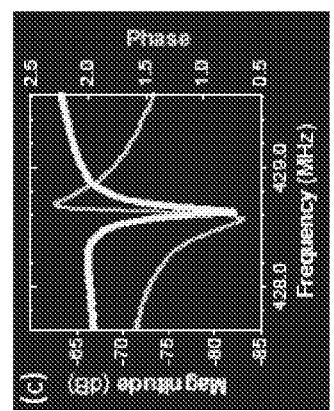

The completed devices, such as depicted in FIGS. 2A and 2B, are geometrically characterized by a scanning electron microscope (SEM). As mentioned above, the NEMS mass sensor used for analysis of a sample is a 100 nm thick, doubly-clamped silicon carbide beam ~1.8 μm long, ~120 nm wide. In addition to its function as an etch mask, the topmost, thin-film metallization layer enables sensitive magnetomotive actuation and transduction. In one embodiment, NEMS devices which flexurally vibrate in-plane, with a typical fundamental mode resonance at ~450 MHz and a quality factor of ~2000 are used. The response curve for such a NEMS is shown in FIG. 2C.

Protein Chips Using SAMs

Figure 3:
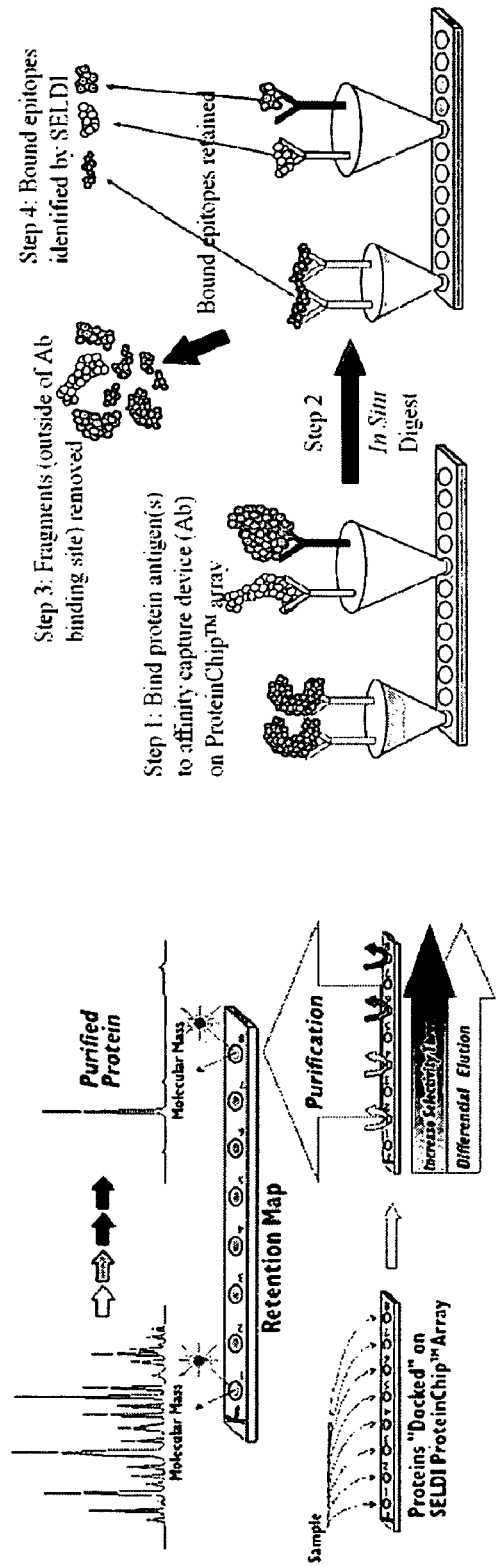
FIG. 3 is a schematic of the SELDI method and its applications for retention mapping chromatography and epitope mapping chromatography.

The immobilization of proteins onto surfaces, e.g. via self-assembled monolayers (SAMs), shows considerable promise for high-throughput MS analyses of biological compounds. Analysis using Surface Enhanced Laser Desorption and Ionisation (SELDI) method (FIG. 3) provides clean assays of proteins that significantly reduce the presence of competing, non-specifically bound species. Furthermore, SELDI permits the creation of multiple samples with highly uniform analyte density, as well as special stringency protocols to isolate particular species of interest. This method can be easily modified to accommodate a wide range of biomolecular species. Thus, combining a protein chip technique such as SELDI with NEMS-MS analysis can provide a wide variety of new and useful tools for proteomics.

NEMS offers some distinctive advantages over other mass spectrometers, such as, its large dynamic range, i.e., its ability to detect molecules of mass 1-Dalton to molecules having a mass equal to $10^9$ Da without compromising its sensitivity. NEMS based mass spectrometers can easily be integrated with microfluidic systems which are commonly used for protein digestion and processing. It is possible to make a compact table-top mass spectrometer using NEMS and the ability of NEMS based mass spectrometers to quickly detect and analyze very small samples makes them ideal for various biological applications such as in proteomics.

Initial NEMS-MS prototypes comprise single injectors delivering analytes to solitary NEMS mass sensors. However, the intrinsic power of the inventive method is not solely in raw sensitivity, but the opportunity to combine sensitivity, compactness, and, scalability. For example, a typical mammalian cell with a diameter of 20 μm has cytosol volume of ~1 pl. Assuming that a typical protein has a hydrodynamic radius of about 20 nm, thia s corresponds to a volume of about ~10 zl per protein. Hence the total number of proteins in such a cell is of order $10^8$. With an integrated array of 500 to 10,000 microfluidic-interfaced NEMS-MS analyzers and more specifically, 1000 microfluidic interfaced NEMS-MS analyzers, one can measure $10^8$ molecules in ~1000 s, i.e., <20 m assuming that each of the 1000 microfluidic-interfaced NEMS-MS analyzers is capable of resolving a protein flux of ~100 molecules/sec. In another embodiment, 2000, 3000, 4000, 5000, 6000, 7000, 8000, or 9000 microfluidic-interfaced NEMS-MS analyzers can be present on a single chip.

Thus, the present invention provides a NEMS-MS spectrometer that has 1000's of multiplexed-NEMS-MS processors to give a device that would ultimately have a form factor comparable to today's MS-MS systems. In one embodiment the number of multiplexed NEMS-MS processors is in the range from about $10^4$ to about $10^9$. Such a mass spectrometer would allow "weighing" every protein within a typical mammalian cell via highly-multiplexed NEMS-MS systems. The manufacture of NEMS-MS systems involves micro- and nanofabrication, methods that are readily scalable to highly-multiplexed instruments and which can be produced en masse.

Figure 4:
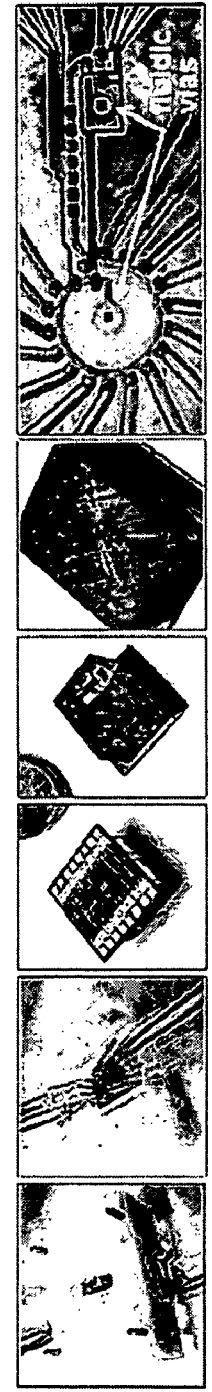
FIG. 4 illustrates an assembly of microfluidics-embedded nanocantilever arrays into functional microanalysis systems.
Figure 5:
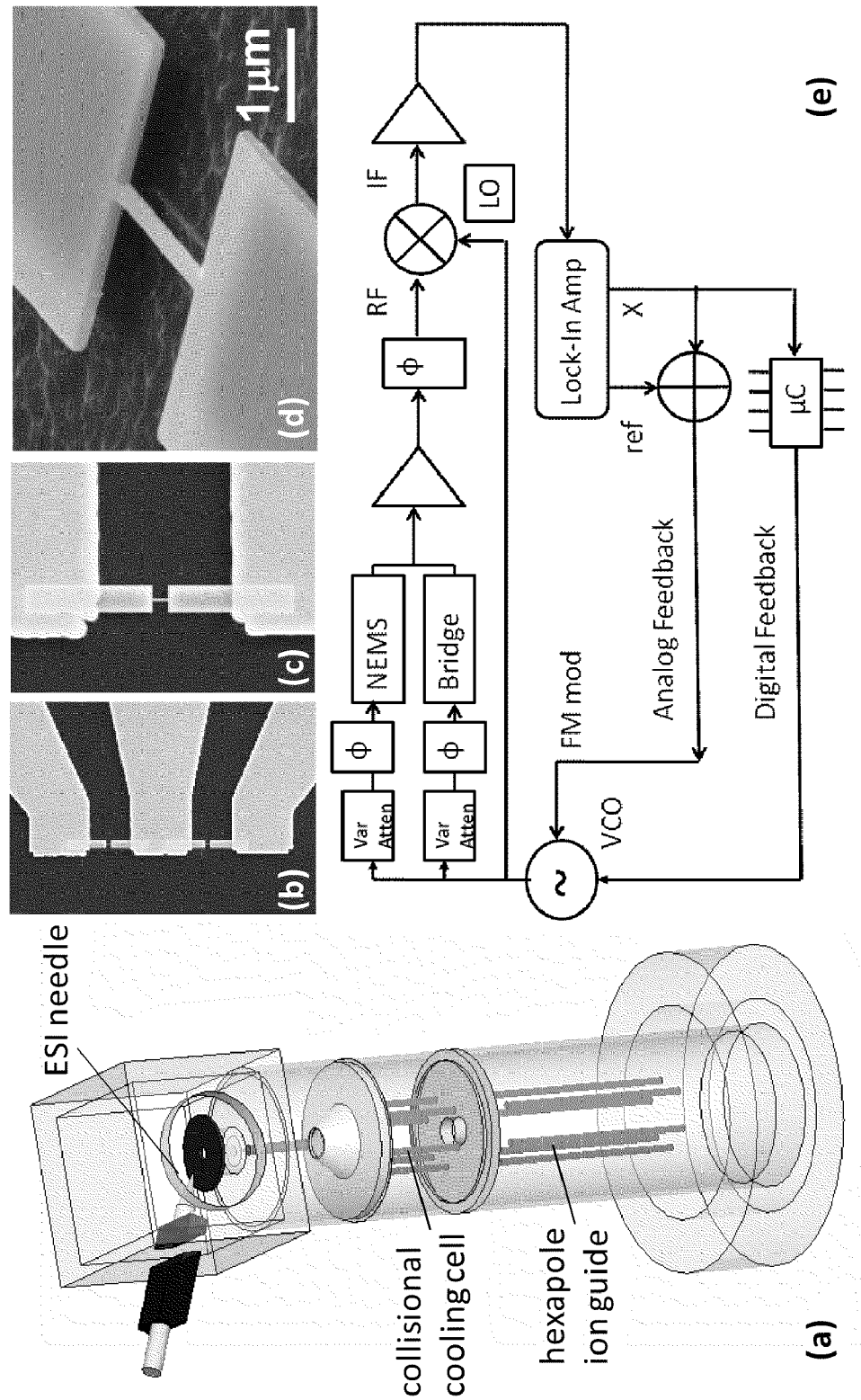
FIG. 5A is a schematic of NEMS MS experimental configuration, showing ESI and the system's two ion optics stages.
FIGS. 5B, 5C and 5D are micrographs showing progressive magnifications of a 482 MHz balanced NEMS resonator similar to the one used in the experiments described herein.
FIG. 5E is a digital phase-locked loop circuitry enabling large capture-range control, and real-time readout of NEMS frequency shift with very low noise.

FIG. 4 illustrates an assembly of microfluidics-embedded nanocantilever arrays into functional microanalysis systems (Arlett et al., Caltech 2004). The two panels on the left show a top/bottom view of a current-generation 2×3 cm chip mount which provides up to 40 fluidic input/output lines and electrical connections for up to 20 nanocantilevers. The three central panels show the front-/backsides of an individual 1×1 cm nanosensor chip fused front and back with microfluidic systems. The rightmost panel is a close-up of the active backside chip microfluidics, showing the 70 μm fluidic vias through the chip coupled to 16 analyte delivery channels, a peristaltic sample recirculation pump, and a valved sample exhaust port.

In one embodiment the analytical performance of the inventive method is enhanced, microfluidic reprocessors are used for carrying out preparatory protocols to that will significantly enhance the "concentration dynamic range" of NEMS-MS. Sample preparation prior to analysis is an important step for biochemical samples in which the species of interest are rare and present in small amounts to otherwise overwhelmingly large background materials, e.g. the identification and detection of a biomarker from serum. In one embodiment, microfluidic sub-systems are used to efficiently deliver the proteins to the NEMS detector array of a NEMS-MS system.

The present invention uses a micro/nanoelectrospray ionization setup for delivering proteins to NEMS, with subsequent analyte transport and delivery to the NEMS sensors being accomplished using a hexapole ion guide. Using magnetomotive displacement transduction and Lorentz force actuation, both in a high magnetic field, a noise floor of ~600 Da has been achieved. Preliminary experimental studies using an NEMS-MS system allowed the detection of molecular species in a sample with a resolution of ~10 kDa. Samples of BSA, β-amylase, apoferritin and gold nanoparticles were used for the initial experiments.

Description of the NEMS-MS Embodiment of the Invention

FIGS. 5A-5D show the experimental setup used to measure the mass of individual proteins. The proteins ions are produced using a commercial Varian electrospray ionization (ESI) system. A Harvard syringe pump is used to continuously deliver the protein solution into the micro-/nanoelectrospray needle at a rate of 4 µl/min. In this experimental setup the electrospray needle is maintained at a constant voltage of about 2.5 kV to about 3 kV. The parameters and the typical values used during for the ESI and the ion optics are given in Table I.

TABLE I

Typical values used during ESI and ion optics

| Parameter | Description | Typical values |
|---|---|---|
| $V_{needle}$ | Voltage on the electrospray needle | 2.5 kV |
| $V_{LA}$ | Voltage on the electrostatic lens between top and bottom hexapole | −20 V |
| $V_{Shield}$ | Voltage on the shield | 600 V |
| $V_{capillary}$ | Voltage on the capillary | 200 V |
| $V_{top\ hex}$ | DC voltage on the top hexapole | 10 V |
| $V_{bot\ hex}$ | DC voltage on the bottom hexapole | 0 V |
| $f_{RF}$ | RF frequency of ac voltage applied to hexapole | 1.25 MHz-450 kHz |
| $V_{RF}$ | Amplitude of the RF voltage applied to the hexapole | 500 V |
| $P_{int}$ | Pressure in the intermediate chamber | 8 mTorr |
| $T_{dry}$ | Temperature of the drying gas | 180 C. |
| $P_{dry}$ | Pressure of the drying gas | 50 si |
| $P_{neb}$ | Pressure of the nebulising gas | 15 psi |
| R | Protein solution flow rate | 4 ul/min |

Electrospray ionization of the proteins in a sample results in the formation of protein ions in the solution within the needle. These ions repel each other due to coulomb repulsion and are forced out of the needle outlet in the form of droplets containing the proteins. When the solvent in these droplets evaporates, smaller droplets having the same amount of charge are formed. These highly charged microdroplets undergo coulomb fission and eventually this leads to the formation of bare ionized proteins which are delivered to the NEMS sensor. Although the exact mechanism of protein formation from small droplets is still under debate, electrospray is a well established technique for producing proteins in vapor form.

The ESI delivery system is built around a commercial sub-assembly (Varian 1200 LC/MS) and comprises the following components:

1) An ESI needle and gas sheath mounted in an outer chamber at atmospheric pressure and room temperature.

2) A $1^{st}$ vacuum stage with a shield plate, counterflow gas path, capillary, and pumping port.

3) A $2^{nd}$ vacuum stage including a skimmer, collisional-cooling hexapole ("top hexapole"), and final high vacuum orifice. This sub-assembly is embedded in a custom $2^{nd}$ stage vacuum chamber designed for about 10 mTorr base pressure for optimal collisional cooling (8, 9) of the ions. It is then attached to the top plate of the high-vacuum cryostat chamber housing the "bottom hexapole" (see below) and the NEMS sample stage. All $N_2$ gas, vacuum port, electronic, and fluidic connections, are connected to external instrumentation.

Electrospray ionization is typically performed at atmospheric pressure and room (or elevated) temperature. This enables the solvent droplets that form beyond the Taylor cone to quickly evaporate down to the bare protein ions they contain. In this first-generation NEMS-MS realization we also employ physisorption to capture and immobilize the analytes on the NEMS sensor's surface. By contrast, this requires that the NEMS be maintained under high-vacuum and low temperature conditions. The experimental setup must provide a match between these rather different conditions. The present invention achieves this with a combination of commercially-available and custom-built cryogenic and differential-pumping components. The NEMS sample stage is located about 2 m away from the ESI source. Since the capture area of the NEMS sensor is small, this necessitates efficient transport of the analyte ions created by electrospray along the 2 m path to guide them to the surface of the NEMS sensor for adsorption.

Transport of ions from atmospheric pressure to the first differential pumping stage is performed through the so called nozzle-skimmer configuration. This produces a highly collinear, monochromatic beam of nitrogen molecules and protein ions. Subsequently, the ions are transported from this initial vacuum stage to the NEMS sensor by a hexapole ion guide system, having an outer radius of ~1.2 cm and total length of ~2 m. The hexapole configuration was chosen as a good compromise between obtaining high transmission efficiency and providing minimal m/z selectivity, to permit simultaneous and non-discriminative transport of a broad range of bio-/chemical species. The configuration employed involves two independent hexapole ion guide stages. The top hexapole, operating in the 10 mTorr vacuum range, provides collisional cooling space charge for injection through an orifice into the vacuum chamber of the main cryostat. The bottom hexapole operating in high vacuum plays a dual role. It acts as an ion "pipe", enabling broadband, high-efficiency transmission of ions over the 2 m path. It is also key in overcoming the magnetic mirror effect that would otherwise reflect the ions back along their initial path as they tried to enter the high magnetic field region. Both hexapoles are driven by a homemade RF oscillator that can supply AC voltages of up to $500V_{peak}$. Additionally, the RF power supply is based on two vacuum tubes operating in a push-pull oscillator configuration, driving an LC load formed by the capacitive load of the hexapole rods and high-voltage inductor and capacitors to tune the frequency of oscillation. The significant length of the lower hexapole sets an upper limit to the frequency that can effectively be applied by the voltage source, though this upper limit does not come into play when probing the large mass species. The NEMS mass sensor is centered about 3 mm below the bottom end of the hexapole guide.

The NEMS detector is sensitive towards the mass of the proteins. Because of its large bandwidth and limited m/z selectivity, the hexapole ion-guiding system can be carefully tuned to maximize the total protein flux at the NEMS. The NEMS detector itself is centered about 3 mm below the bottom end of the hexapole guide. As will be discussed below, to ensure adsorption of the protein on the NEMS detector, the detector stage is maintained at a reduced temperature of 40K in an evacuated chamber. Through van der Waals forces, the macromolecules physisorb (stick) quite strongly to the surface of the NEMS detector. To maximize the physisorbtion of ions onto the detector stage, the stage is placed inside the bore of a 7 Tesla superconducting magnet cooled within a liquid helium cryostat.

The detection circuitry utilizes a bridge circuit to nullify the background near the NEMS resonance and a frequency modulated (FM) phase locked loop (PLL) to track the NEMS frequency shift. As the proteins land on the NEMS, the resonant frequency of the NEMS changes which is tracked in real time by the PLL. Additionally, the protein ion current reaching the detector stage is monitored by a Faraday cup beneath the detector while on-chip Faraday sensor monitors the protein current at the detector plane. The current read out by this on-chip microsensor has lower resolution than the macroscopic Faraday cup below the detector and is only used to provide a calibration of the flux arriving at the NEMS.

The actual protein flux arriving at the NEMS detector is deduced by measuring the current arriving at the two aforementioned Faraday detectors. For example, if the m/z of the species produced by the ESI is ~1000, using the known ratio of area between the NEMS and the on-chip Faraday cup, we can estimate the protein current, and hence the mass flux, seen by the NEMS detector. Since the current measurement during the experiment is done by the macroscopic Faraday cup, a one-time calibration is performed to find the relation between the two measurements. Based on such calculations, a typical current of 1 pA measured using a macroscopic Faraday cup will produce about 3 events per minute for BSA ions delivered through electrospray. Although the value for the flux based on such calculations is infinitesimal compared to the flux in conventional mass spectrometers, it is more than enough to sense the mass of protein molecules using NEMS. Furthermore, the protein flux can be increased by using a detector array having multiple NEMS sensors in proximity to each other.

Figure 6:
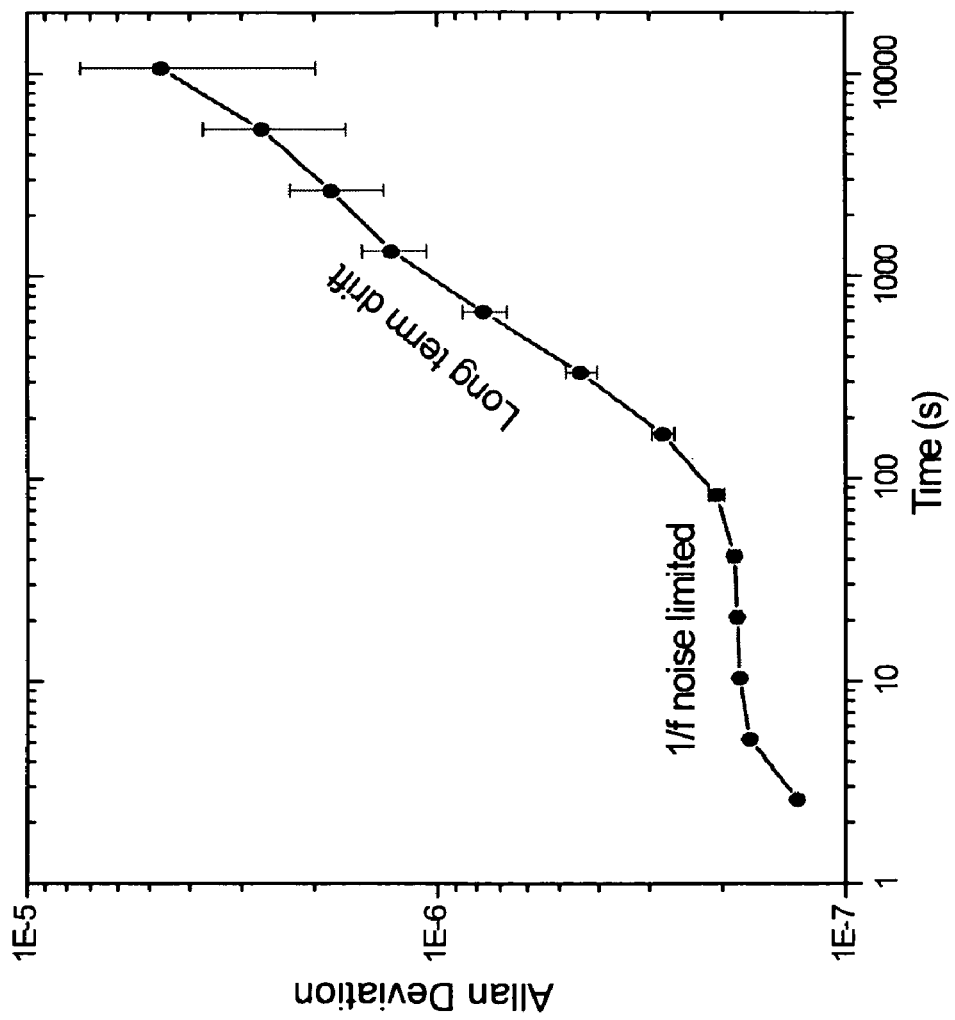
FIG. 6 is a plot of Allan deviation versus time for a NEMS resonator phase locked in a control circuit at its fundamental vibrational mode at 441 MHz.

To enhance the sensitivity of detection, particularly to a level where proteins whose masses differ by 1 Da can be differentiated from each other, it is desired to have knowledge about the experimental noise floor. To determine the noise floor, a control sample devoid of proteins is ionized by ESI and the resonant frequency shifts at the NEMS detector are measured using a frequency modulated PLL. The resulting measurement when plotted as a function of time is a measure of frequency stability of an oscillator (Allan deviation). FIG. 6 shows such a plot. From simple calculations of the noise, temperature of the amplifier in the circuit and the maximum drive before the onset of nonlineary due thermomechanical noise, an Allan Deviation of $5 \times 10^{-9}$ is obtained. The minimum measurable mass using the experimentally obtained Allan deviation provides an estimate for the minimum measurable mass using the NEMS and is about 10 KDa.

Figure 7A:
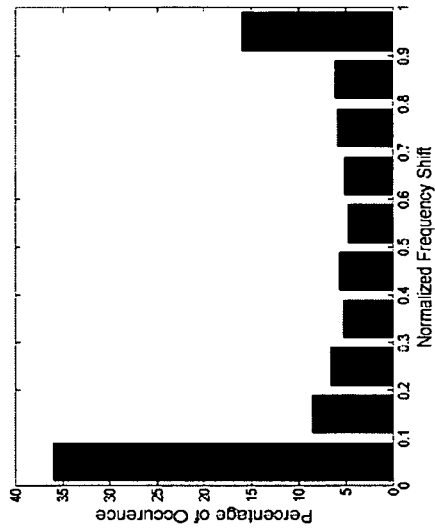
FIGS. 7A-7D are conceptual illustrations of single protein capture sensitivity and signal statistics obtained from a single NEMS mass sensor.
Figure 7B:
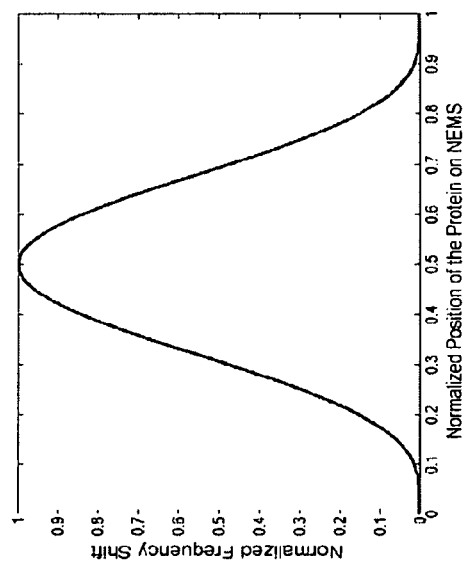
Figure 7C:
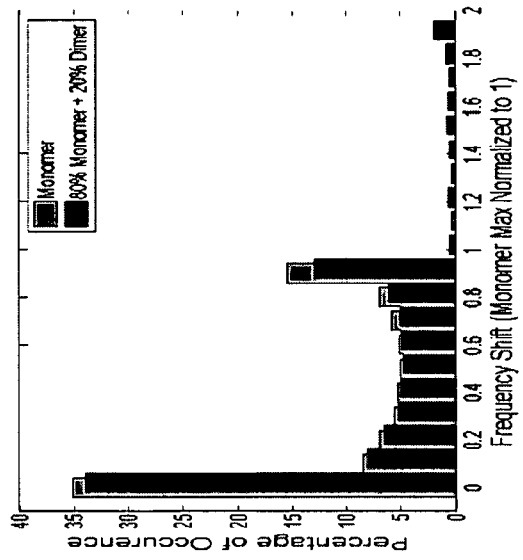
Figure 7D:
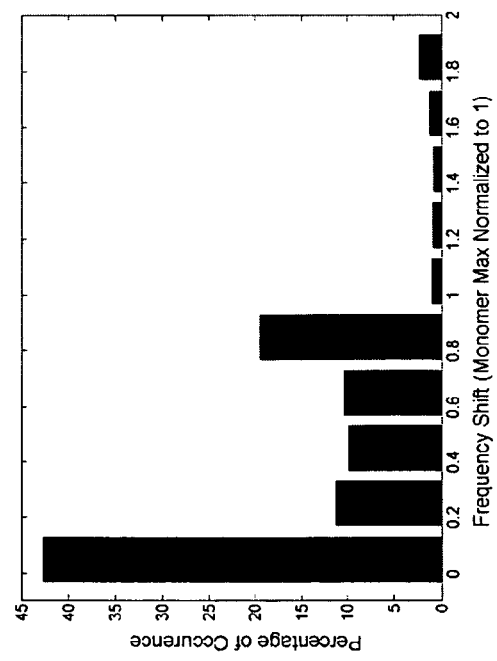

In addition to enhancing the noise floor to improve sensitivity of detection, the response of the NEMS to a protein depends on the landing location of the protein on the NEMS. The fractional frequency shift due to a protein is proportional to the fractional kinetic energy change of the NEMS. Hence the frequency shift at a given position is proportional to the square of the NEMS vibration amplitude at that point. FIGS. 7A-7D illustrates the sensitivity and signal statics theoretically, for position dependent response of NEMS. Also shown in FIG. 7B-7D are theoretical histograms for a monodisperse BSA solution and a solution containing BSA monomers, and dimers having 20% concentration of the monomers. The histogram can be more complicated if more than one polymer is present in the sample, or if polymers splits into subunits during the ESI process. Examples of proteins used to test the claimed NEMS-MS method include BSA (66 kDa protein), β-amylase (a tetramer of 200 kDa) and Apo-ferritin (450 kDa protein with 24 subunits). Each protein was electrosprayed on to the NEMS and each protein runs is immediately followed by a control run During the control run all the parameters of the experiment are the same expect the protein solution flow is stopped.

Figure 8A:
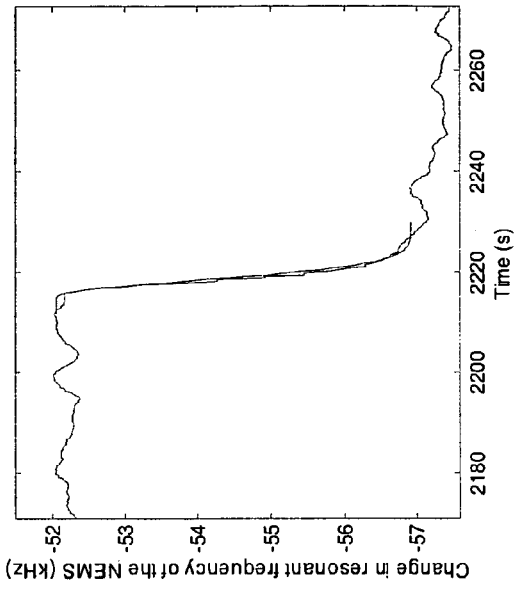
FIGS. 8A and 8B are experimental traces (dark curve) showing NEMS frequency shift induced by individual protein (Apoferritin) landing events and automated data extraction. The change in frequency is directly proportional to the mass of the protein. A MATLAB program is used to find the abrupt frequency transitions, The program then applies a standardized method to fit each detected event using a non-linear least square fit (light curve) and thereby extract the magnitude of frequency shift.
Figure 8B:
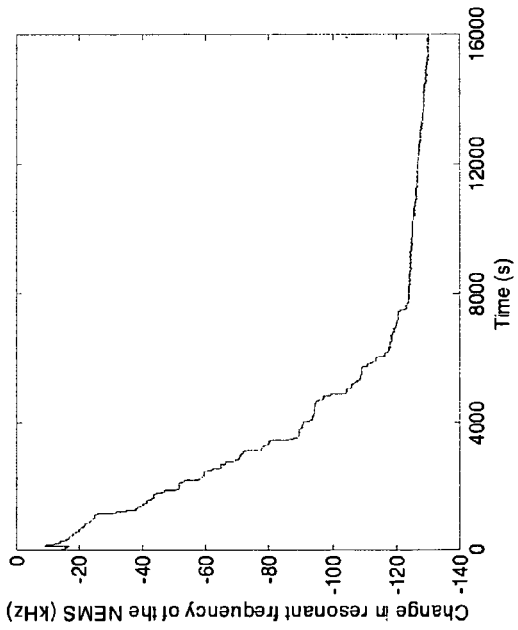

FIGS. 8A and 8B show one such ESI run for the protein Apo-ferritin. In FIG. 8, the raw data is shown in dark while light lines are the fits to the frequency steps picked using a MatLab program. To verify that the frequency steps observed are the result of proteins landing on the NEMS, a series of control runs were performed. One control run involves ionizing a solution devoid of proteins and allowing the ionized solution to land on the NEMS. A second control run involves turning off the ESI needle voltage, to prevent ionization of sample, keeping all other parameters the same as during the actual ESI. Also used as a control is a run wherein the syringe pump pushing the solution is turned off.

Figure 9:
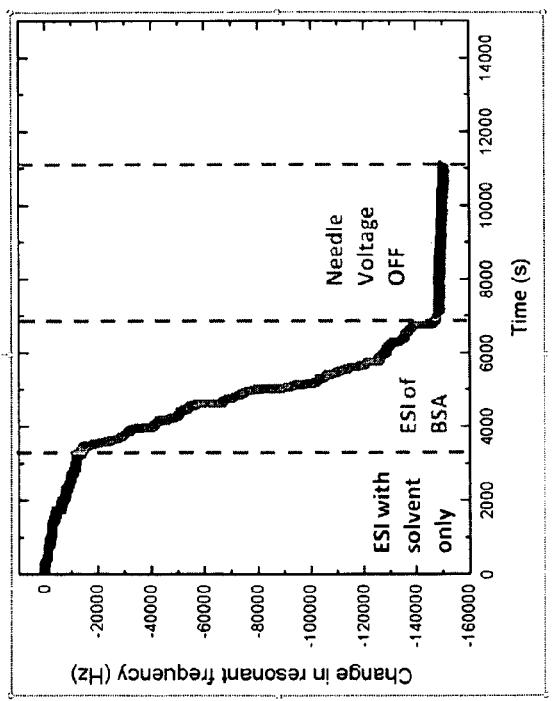
FIG. 9 is a graph showing the frequency evolution of the NEMS mass sensor during the ESI and the control runs.

FIG. 9 shows the evolution of the resonant frequency of the NEMS during the ESI and the three control runs. It is quite clear from the figure that the resonance frequency changes much more rapidly during the ESI of proteins than during the control runs. The graph also shows very few frequency steps during the control runs. The few frequency steps seen during the control run with just the solvent of the protein are attributed to the residual proteins left in the fluidic delivery system of the ESI, rather than a change in resonant frequency due to the solvent alone. Furthermore, for control runs in which the flow of liquid is turned off or no voltage is applied to the needle, the drift in frequency as a function of time is similar to the background drift.

Figure 10:
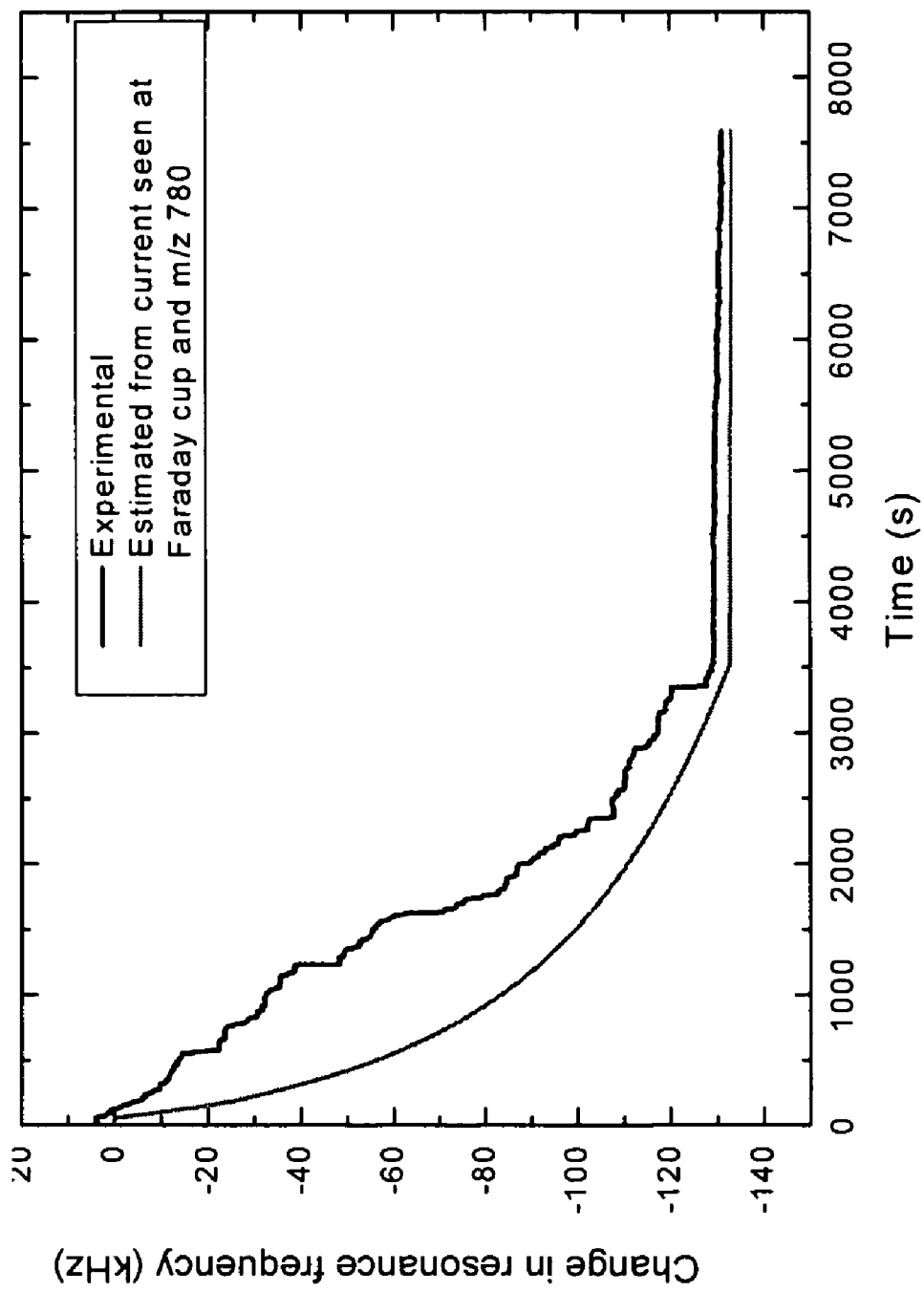
FIG. 10 is a graph showing the expected and actual NEMS frequency change during the experiment. The expected curve is calculated using the ionic current measured and converting into mass deposited on the NEMS.

Another distinguishing feature is that the ESI process produces species with m/z ~1000. To verify that the species produced by ESI have m/z values of 1000 Da, the experimental frequency change of the NEMS due to mass loading is compared to the current at the faraday cup (FC) and the relative size of NEMS and the FC. FIG. 10 shows the frequency change of the NEMS due to mass loading and the expected frequency change if we assume m/z to be 780. Graphical representation of the theoretical and experimentally determined change in resonance frequency as a function of time enhances confidence that the frequency steps seen during the experimentation are indeed due to the proteins landing on the NEMS.

The invention is further described by the following non-limiting examples.

Figure 11:
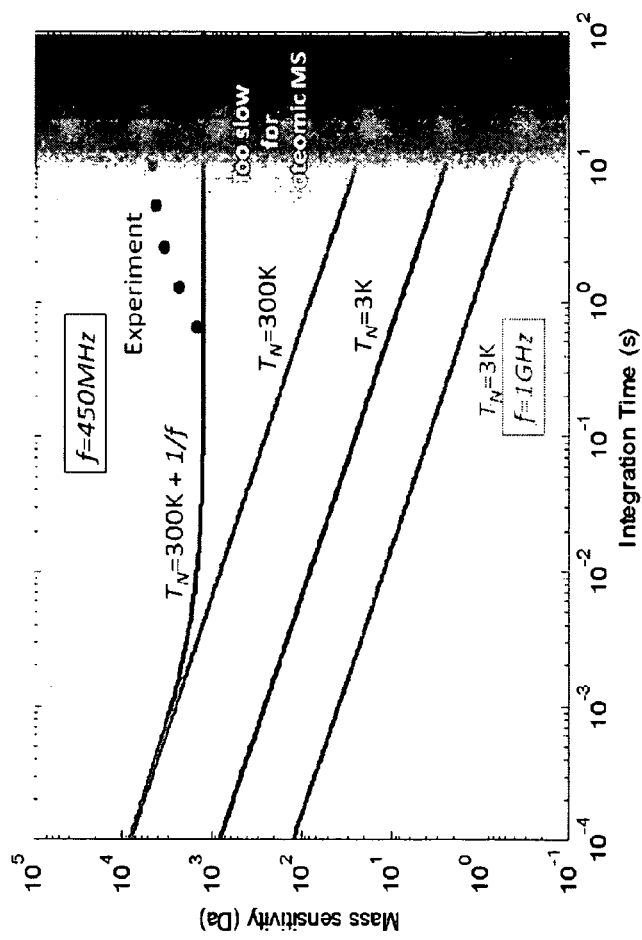
FIG. 11 shows the mass sensitivity of the present experiment and the roadmap towards single Dalton resolution. The upper curve is the theoretical prediction for the present experimental setup with contribution from both the thermomechanical noise and 1/f noise. The second (from the top)

To enhance sensitivity and resolution of detection, it is necessary to lower the noise floor of the measurement by keeping the value of the Allan deviation as close to the theoretically determined value of to about $5 \times 10^{-9}$. A graphical representation of the parameters that can be improved for enhancing the current mass sensitivity is shown in FIG. 11. All the calculations are based on the following simple equations $$DR = 20\log_{10}\frac{X_{max}}{X_{noise}}$$

$$\Delta m = 2M_{eff}\left(\frac{1}{\tau\omega_0 Q}\right)^{1/2} 10^{-DR/20}$$

where, $X_{max}$ is the rms displacement of the NEMS at which its response becomes non-linear, $X_{noise}$ is the total displacement noise within the integration time (15). This includes effects such as thermomechanical and 1/f noise, $M_{eff}$ is the effective mass of the resonator, Q is the quality factor, $\omega_o$ is the resonant frequency and $\tau$ is the integration time of the measurement.

FIG. 11 shows the mass sensitivity range using the current experimental parameters. Also shown are the optimized parameters for achieving single Dalton resolution. The uppermost curve is the theoretical prediction for the present experimental setup with contribution from both the thermomechanical noise and 1/f noise. The second curve (from the top) is the thermomechanical limit with the present setup. By using an amplifier with a noise floor of 3 K, we expect the mass sensitivity to reach the level of 10 Da (black curve). To attain the single Dalton sensitivity, it is desired to increase the resonant frequency of the NEMS to 1 GHz and also use higher order vibrational modes. The lowest curve is obtained by assuming a NEMS of 1 GHZ and noise temperature of 3 K.

The first step towards building a NEMS based MS as an analytical tool for routinely screening biological samples and detecting individual proteins in real time, entailed moving the NEMS from a completely enclosed chamber to a chamber with an inlet for proteins. Integrating the NEMS measurement system with an electrospray ionization system required cooling the NEMS to 40 Kelvin to facilitate physioadsorption of protein.

Moreover, to facilitate high throughput proteomics using the NEMS-MS, the integration times due to the slow readout time of the frequency counter should be in the millisecond range. For example, if the NEMS frequency using a counter is 10 points/second, it limits throughput to 10 points per adsorption event give a response time is 1 sec. This results in data having a larger component of 1/f noise. Another modification for lowering the contribution of noise in the measurement is to use an amplifier with a noise temperature of 3K, to further reduce the noise floor by an order of magnitude.

Additional improvements in the sensitivity of NEMS-based mass spectrometer are provided by improving the quality factor and increasing the NEMS frequency. One way to improve the quality factor is to minimize intrinsic mechanical dissipation of NEMS by reducing clamping losses. It has also been shown that using a mechanical layer with built-in stress can improve the quality factor of NEMS by up to a factor of 5. Because the minimum detectable mass using a NEMS resonator is given by $$dm = \frac{\delta\omega}{\Re},$$

where $\Re$ is the responsivity of the NEMS and is given by $$\Re = \frac{\omega_0}{M_{eff}}$$

and $\delta\omega$ is the frequency noise of the measurement.

A simple method of increasing the NEMS frequency is to shrink the size of the device. However, this typically reduces the quality factor by up to an order of magnitude, as a result of surface defects which play a dominant role in the small sized devices with high surface to volume ratios. An alternative approach to increasing the NEMS frequency is to build-in stress in the material used to make the NEMS. This is achieved by depositing metallic layers at the end of the NEMS to induce stress that would increase the resonant frequency while keeping the size of the NEMS big enough to produce large quality factors.

In yet another aspect, sensitivity is enhanced by simultaneously monitoring multiple resonant mode frequencies in addition to the fundamental resonance mode at a given resonator. Simultaneous detection of higher resonant modes is advantageous because it enhances the signal due to the responsivity of the NEMS at the higher frequency. Monitoring of multiple resonant mode frequencies can be accomplished using thermoelastic actuation and piezoresistive detection which allows detection of up to 12 separate modes. Monitoring multiple modes simultaneously gives information about the position of the protein on the NEMS, which simplifies the deconvolution of the mass of proteins.

Multimode Mass Detection to Separate Out the Mass and Landing Position of a Protein The frequency response of NEMS to a protein depends on where the protein lands, which complicates the accurate determination of the protein's mass. FIG. 12 depicts a schematic of a double-clamped NEMS. For a beam vibrating out of the substrate plane, the x-coordinate denotes the vibration amplitude of the center of the NEMS beam. The y-coordinate denotes the vibration amplitude of the beam where the protein lands. The a-coordinate denotes how far the landing position is from the edge of the beam. Here for small amplitude vibrations, the length of the beam can be approximated to be unchanged throughout the motion. By assigning $\delta M$ as the mass of the protein and if the effective mass of the resonator is $M_{eff}$, application of classical mechanics shows that:

Potential Energy = $V = 1/2kx2$

Kinetic Energy = $T = \frac{1}{2}M_{eff}\dot{x}^2 + \frac{1}{2}\delta M \dot{y}^2.$ To solve these equations, however, we need a relationship between y and x. The relationship between x and y is a function of landing position "a" deduced from the mode shapes using elasticity theory. The mode shape for a doubly-clamped beam has a complicated analytical formula. Denoting for practical purposes, that the mode shape is C(a), then as shown in FIG. 13, C(a) can be normalized so that C(L/2)=1 where L is the length of the beam. At the edges C(0)=C(L)=0. Thus, the simple relationship between the vibration amplitude x at the center of beam and the protein vibration amplitude y when the protein is located at position "a" is y=C(a) x The term for kinetic energy is modified to $$T = \frac{1}{2}M_{eff}\dot{x}^2 + \frac{1}{2}\delta M \dot{y}^2 = \frac{1}{2}M_{eff}\left[1 + C(a)^2 \frac{\delta M}{M_{eff}}\right]\dot{x}^2$$

Calculation of the frequency shift of a protein as a function of its landing position yields:

$$\frac{\Delta \omega}{\omega_0} = -\frac{1}{2}\frac{\delta M}{M_{eff}}C(\alpha)^2$$

where $\Delta\omega$ is the frequency shift due to protein and $\omega_0$ is the natural NEMS frequency.

Because measurements involving the frequency change of only one mode gives insufficient information to simultaneously determine the protein's mass and its landing position "a" the present inventors simultaneously excite and detect both the first and second flexural modes of the NEMS beam. By combining the frequency shift information from both channels the inventors can determine the mass and the landing position (as a nominal distance from the center of the beam) of the protein. FIGS. 13A and 13B graphically depict the frequency change of an NEMS as a function of the landing position of the protein. FIG. 13A illustrates the spatial response due to change in frequency of the first mode while 13B illustrates the spatial response from the second mode. Although only two modes are sufficient to determine the position and the mass of the protein landing on the NEMS, higher modes can be used to improve the accuracy of the measurements.

Preprocessing and Microfluidics

The successful implementation of NEMS based mass spectrometry as a tool for proteomics requires the development of methodologies for the preprocessing and delivery of the biological sample. Because of the relatively small size of the samples advanced microfluidic methods are being used for sample delivery. To be effective, the microfluidic delivery methods used must overcome the following shortcomings of previously used sample delivery methods First, they should allow proper evaporation of solvent (if the protein is used in solution form) before the protein reaches the NEMS. Second, prevent protein solution from freezing due to solvent evaporation in the vacuum environment of the NEMS. Third, effectively deliver protein from source to NEMS, while maintaining the source at room temperature and the NEMS at low temperature for maximum physisorption. Several microfluidic delivery systems known in the literature can readily be coupled to NEMS for high throughput proteomic work. Some methods for providing a mixture of proteins for ionization prior to detection using NEMS include ROBIN (ROtating Ball INlet), surface display methods such as Surface-Enhanced Laser Desorption Ionization (SELD), Inertial NEMS (i-NEMS), ElectroWetting Of Dielectric (EWOD) and Electrohydrodynamic (EHD) Ionization.

ROBIN (ROtating Ball INlet)

A simplified setup of this microfluidic system integrated with NEMS is shown in FIG. 14. The system would be composed of an array of NEMS which would be actuated by the thermoelastically and detected using the changes in the piezoresistance of the lead on the NEMS. The array of NEMS would be placed inside an evacuated chamber. The other end of the chamber would serve as the inlet for the proteins. The protein supply would be continuously maintained by a microfluidic system outside the vacuum chamber which would replenish the grooves in the cylinder with protein, buffer solution and matrix. As the cylinder rotates, each groove containing the protein matrix would be subject to a laser pulse inside the vacuum chamber. Every rotation of the chamber would end with a cleaning step that would remove the waste stuck to the cylinder. A vacuum o-ring is used at this end to maintain the vacuum while the cylinder is rotating. As the proteins land on the NEMS, the frequency shift of the NEMS is recorded in real time. The frequency shift histogram would give us the information about the mass of the proteins.

SELDI

SELDI takes advantage of the interaction between the surface of gold and sulphur atoms of terminally-substituted alkanethiolates to make a self assembled monolayer. These monolayers are formed by immersing a gold coated substrate in a solution containing alkanethiols. These alkanethiols present the ethylene glycol group oligomer which prevent non specific binding of the proteins. Also, ligands can be immobilized on these monomers by making solutions of ligand terminated alkanethiol. These ligands are then used to associate specific proteins. The density of ligands in the solution is kept low to prevent non specific binding. Other chemical reactions are also routinely used to immobilize ligands on the monolayer, such as the Diels-Alder reaction, which is based on the reaction of cyclopentadiene with a benzoquinone ligand of a SAM. While SAM's provide a good surface for specific binding of peptides and carbohydrates, proteins are usually captured by non-specific binding. For better control of the density and specific binding of proteins, fusion proteins can be used. Each fusion protein is made of two parts: a capture protein, which attaches to the ligand provided by the SAM; and a target protein. This process has been used to immobilize a number of fusion proteins. One simple implementation that could utilize the benefits of these techniques would be to make peptide chips offline for insertion into the NEMS MS chamber. The ligands can then be selectively released from the chip using the electric potential.

Inertial NEMS (i-NEMS)

In an alternate embodiment, Inertial NEMS (i-NEMS), a novel and integrable approach to create individual protein molecules is used. The i-NEMS spraying system uses a hollow cantilever as a flow channel for delivering the sample from a microfluidics delivery system to the NEMS as shown in FIG. 15. According to this method, the cantilever is set to vibrate as liquid is pumped toward the tip of the cantilever. The motion of the cantilever, causes the liquid emerging from the tip of the cantilever to experience an acceleration in excess of $10^9$ g and form very fine droplets through Rayleigh instability comparable to the size of the channel through which the liquid is being delivered (~50 nm), thus, obviating the need for Coulombic fission of the droplets for size reduction. The solvent from the small droplets exiting the cantilever is gently evaporated by a drying gas or by microwave radiation to give protein molecules whose mass is measured by the NEMS detector. i-NEMS is a neutral mass spectrometric method that allows the sampling of a biochemical composition of analytes without any excess ionization of the protein species. The NEMS detector is the only detector known that is capable of measuring the mass of the proteins without the need for ionization, and coupled with inertial NEMS, will uncover a previously inaccessible sampling.

In the context of the present invention, the i-NEMS spraying technique is an efficient way to enhance the sensitivity of NEMS-MS. For example, by using a channel having dimensions of 100 nm×100 nm, and by exciting the higher modes of inertial NEMS using thermoelastic actuation, vibration frequencies as high as 100 MHz are possible. Furthermore, if the liquid is pumped at a speed of 1 nL/min which corresponds to 10 nm of liquid jet exiting the channel for every oscillation, and the oscillation amplitude of the cantilever is "a", the force required to create extra droplet surface is:

Surface Tension≈Perimeter of channel×Surface Tension of water $$= 400 \text{ nm} \times 72 \frac{\text{dyne}}{\text{cm}}$$

$$= 3 \times 10^{-8} \text{ N}$$

The force exerted on the liquid jet by the NEMS device is calculated as:

$$\text{Inertial Force} = M_{Water_{jet}} a\omega^2$$

$$= 10^{-2s} \text{m}^3 10^3 \frac{\text{kg}}{\text{m}^3} 3.6 \times 10^{17} s^{-2} a$$

$$= 3.6 \ 10^{-2} a$$

Therefore, the droplet formation condition is satisfied when $$3.6 \times 10^{-2} a \geq 3 \times 10^{-8} \rightarrow a \geq 83 \text{ nm}$$

The size of the droplets will be about 46 nm in diameter. The above exemplary calculation suggests that cantilevers can be used to deliver analyte to the NEMS.

EWOD (Electro Wetting Of Dielectric)

Still another microfluidic system suitable for NEMS-MS is ElectroWetting Of Dielectric (EWOD). This technique is based on the principle of changing the contact angle of the droplet using electrostatic voltages. A simple diagrammatic representation of such a system combined with NEMS-MS is shown in FIG. 16. An array of electrical gates is used to move the droplets over a hydrophobic substrate from the reservoir to the point of interest. These devices have been used to mix, pump, and cut analyte droplets. Although this is a promising method of manipulating droplets, there are a number of challenges such as the problem of protein fouling, where proteins tend to stick to hydrophobic surfaces, making subsequent control of droplets difficult. The final step of this delivery method requires solvent evaporation which is done by using microwaves or a laser.

Electrohydrodynamic (EHD) Ionization

In one embodiment, electrohydrodynamic ionization (EHD) is used produce protein ions in vacuum. The protein solution is delivered into the vacuum system using a fluidic line. The end of the fluidic line is terminated with a high-voltage needle, as with ESI. A liquid with a high surface tension is used as the solvent (such as glycerol). Thus, when a high voltage is applied, solvent droplets are not formed. Instead, the protein ions close to the surface of the liquid are field desorbed into the vacuum. The incoming protein flux is efficiently collected by placing a NEMS chip near the EHD needle.

As mentioned above, several parameters need to be optimized for analyzing protein species with single Dalton mass sensitivity. These include very large scale integration of the NEMS detectors onto a single chip, the integration of microfluidic delivery systems for on-chip protein digestion, on-chip pre-concentration of sample and on-chip analysis. Although, techniques for carrying out the individual steps exist, the present inventors have integrated these techniques on to a single chip to enhance the sensitivity of the claimed NEMS-MS.

FIG. 17 illustrates a microfluidic chip coupled with a microfluidic protein delivery mechanism. The chip comprises channels which have trypsin derivatized microbeads at the sample inlet and a series of channels on the surface of the chip to transport the sample to the outlet which has a ROBIN needle, i-NEMS, or other spray-ionization systems disclosed above.

Some advantages of these miniaturized techniques are faster, simpler sample preparation with minimal loss, smaller dead volume, and low crosscontamination. For example, on-chip protein digestion necessary for protein finger-printing uses tryptic enzymes immobilized on micro-beads to fill a microfluidic chamber in which tryptic digestion will take place efficiently. Additionally, solid-phase extraction (SPE) has been developed as a means to concentrate trace amounts of proteins from a biological sample when using microfluidics devices. SPE, requires packing a fluidic channel with C18 reverse phase beads. Alternatively, UV-selective in situ polymerization of SPE material to create a monolith SPE column can also be used to pack the fluidic channel. Additional increases in the sensitivity of detection can be obtained by using on-chip liquid chromatography to separate the peptides and proteins in a sample. Liquid chromatography can be accomplished by filling a long flow channel with ion-exchange beads or reverse phase chromatography beads with gradient elution. On-chip electrochemical pumps can be used for gradient elution. Just as in SPE, in situ polymerization is an alternative to microbead for filling the channels of the microfluidic device. Moreover, liquid chromatography can be performed using the same beads used for pre-concentrating the sample.

In yet another embodiment, NEMS-MS can be used for the detection and analysis of environmental pollutants, in proteomics, as well as the identification of other macromolecules such as antibodies, DNA, RNA. NEMS-MS can also be used for analysis of samples containing synthetically prepared proteins, peptides, DNA, RNA or other polymers.

Example 1

Generation NEMS-MS Spectra

To provide an unbiased extraction of NEMS-MS mass spectra from the experimentally obtained event-probability histograms, the experimental data is fit to realistic models. These models are based on predicted NEMS-MS event-probabilities assuming the injection of multicomponent mixtures—in these experiments, sample solutions containing either a Au nanoparticle dispersion, a family of BSA oligomers, or a family of re-aggregated D-amylase subunits. The fits are provided in an unbiased manner through automated procedures that allow the relative intensities of the sample's components to be deduced. After treating the intensities of the solution components as variable parameters, and use the minima of the sum-of-squared-errors (SSE) to determine the relative intensities of the (variable-radius) nanoparticles or molecular species that adsorb upon the NEMS.

Calculation of the SSE

Gold: A theoretical histogram from 1 million adsorption events is generated. The histogram assumes a normalized mass of 1 for the nanoparticle and includes the effect of a frequency resolution of 250 Hz. The mean radius of the gold nanoparticles is varied in steps of 0.01 nm from 1.9 nm to 2.9 nm and the standard deviation in steps of 0.003 nm from 0.2 nm to 0.75 nm. Theoretical histograms are generated by "resealing" the master histogram for each value of the mean radius and the standard deviation. Each theoretical histogram is then compared against the experimental histogram to calculate the SSE for each specific radius/deviation value. The contour map of FIG. 18 represents the SSE's determined in this manner.

BSA: A theoretical histogram of 100,000 events is generated similar to the one for the gold. In this case we assume that the protein is composed of five oligomers: monomer, dimer, trimer, tetramer, and pentamer. The fractional intensities of the monomer, dimer, trimer and pentamer event probability is changed in steps of 0.01. Fine adjustments of the tetramer value, the weakest peak in the experimental curve, are carried out to maintain the total weight of unity. The effect of the frequency shifts <500 Hz which are deemed experimentally unreliable (as these are heavily biased by NEMS frequency-fluctuation noise) is suppressed in the SSE. For each set of probabilities for the oligomers, we "rescale" the histogram and compare it with the experimental histogram to calculate the SSE.

β-Amylase: A theoretical histogram of 100,000 events is generated similar to the one for the gold. In this case we assume that the protein is composed of monomer and the other four of its first five reaggregated subunits. The subunits themselves can aggregate to form particles of higher mass. Here the monomer and subunit event probabilities are changed in steps of 0.02. As for BSA, the SSE in this case are weighted to reduce the effect of the freq shifts <500 Hz. As for the previous examples each set of probabilities for the oligomers, we "rescale" the histogram and compare it with the experimental histogram to calculate the SSE.

Example 2

FIG. 19 shows the results obtained from ESI of β-amylase with a hexapole drive frequency of 450 kHz. The event probability histogram displays a broad peak at 3600 Hz, which we associate with the β-amylase monomer. Sweet potato β-amylase is known to be a tetramer of identical subunits and under a variety of experimental conditions the protein molecules can fragment into individual subunits. The broadening of the monomer peak, as well as the absence of a clear bicuspid shape in the histogram, arise from the presence of such protein subunits in these experiments. As shown by the curve "decomposition" in FIG. 19, the experimental histogram can be readily explained by assuming a weighted superposition of subunits.

The foregoing description of the embodiments of the invention has been presented for purposes of illustration and description. It is not intended to be exhaustive or to limit the invention to the precise form disclosed, and modifications and variations are possible in light of the above teaching or may be acquired from practice of the invention. The embodiments were chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. An apparatus for measuring a mass of a sample, comprising:
   a nanoelectromechanical system (NEMS) arranged to receive a biological sample added onto a resonator of the NEMS at a landing position; and
   a microfluidic sample delivery and sample ionization system;
   wherein the nanoelectromechanical system is located at an output of the ionization system.

2. The apparatus of claim 1, wherein changes in the frequency of vibration of the resonator indicate a magnitude of mass added to the resonator.

3. The apparatus of claim 1, wherein an electronic circuit is configured to drive the resonator and to measure a vibrational frequency of the resonator.

4. The apparatus of claim 1, wherein the biological sample comprises a mixture of proteins or a mixture of peptides.

5. An apparatus for measuring a mass of a sample, comprising:
   a nanoelectromechanical system (NEMS) arranged to receive a biological sample added onto a resonator of the NEMS; and
   a microfluidic sample delivery and sample ionization system;
   wherein the nanoelectromechanical system is located at an output of the ionization system the ionization system comprising an inertial NEMS (i-NEMS) spraying system.

6. The apparatus of claim 5, wherein the i-NEMS spraying system comprises a hollow vibrating cantilever as a flow channel for delivering the sample, and
   wherein the vibrational frequency of the cantilever causes liquid emerging from the tip of the cantilever to accelerate and form droplets which exit from the tip.

7. The apparatus of claim 1, wherein the ionization system comprises Surface-Enhanced Laser Desorption Ionization (SELDI) of the biological sample from monolayers on to the resonator of the NEMS.

8. The apparatus of claim 1, wherein the nanoelectromechanical system comprises an array of NEMS resonators having at least one dimension less than 1000 nm and are selected from the group consisting of cantilever resonantors, clamped beam resonators, and plate resonators.

9. An apparatus for measuring a mass of a sample, comprising:
   a nanoelectromechanical system (NEMS) arranged to receive a biological sample added onto a resonator of the NEMS; and
   a microfluidic sample delivery and sample ionization system;
   wherein the nanoelectromechanical system is located at an output of the ionization system,
   wherein changes in the frequency of vibration of the resonator indicate a magnitude of mass added to the resonator and
   the changes in the frequency of first and second flexural vibration modes of the resonator are simultaneously detected.

10. The apparatus of claim 3, wherein the change in the oscillation frequency of the resonator is detected using a frequency modulated phase locked loop.

11. The apparatus of claim 1, wherein the sample is a biological sample.

12. The apparatus of claim 11, wherein the biological sample is digested prior to ionization.

13. A measurement method comprising:
    ionizing a sample delivered;
    receiving the ionized sample onto a resonator of NEMS at a landing position; and
    detecting a vibration frequency of the resonator to measure an adsorbed mass of the sample.

14. The method of claim 13, wherein the NEMS detects a mass of the sample in the range from about 1 Da to about 100 Da.

15. The method of claim 14, wherein the mass is in a range from about 1 Da to about 10 Da.

16. The method of claim 13, wherein the sample is delivered to an ionization system by a microfluidic delivery system.

17. The method of claim 13, wherein the sample is a biological sample.

18. The method of claim 17, wherein the biological sample is ionized by an inertial NEMS (i-NEMS) spraying system.

19. The method of claim 17, wherein the biological sample comprises proteins, peptides and biological macromolecules.

20. The method according to claim 13, wherein the sample contains environmental pollutants and the detecting step detects environmental pollutants.

21. The method according to claim 19, wherein the step of detecting counts a number of proteins in a biological sample.

22. The method according to claim 13, wherein the NEMS resonator is less than 1000 nm and is selected from the group consisting of a cantilever resonantor, a clamped beam resonator, and a plate resonator.

23. A measurement method comprising:
    ionizing a sample delivered;
    receiving the ionized sample onto a resonator of NEMS; and
    detecting a vibration frequency of the resonator to measure an adsorbed mass of the sample wherein a change in a frequency of a first and a second flexural vibration mode of the resonator are simultaneously detected.

24. The method according to claim 13, wherein the NEMS resonator is maintained at a temperature of about 40K or lower to immobilize the sample onto the resonator.

* * * * *